US005716714A

United States Patent [19]

Chen et al.

[11] Patent Number: 5,716,714

[45] Date of Patent: Feb. 10, 1998

[54] LOW WRINKLE PERFORMANCE FUSER MEMBER

[75] Inventors: Jiann H. Chen, Fairport; William B. Vreeland, Webster; John E. Derimiggio, Fairport; David F. Cahill, Rochester; Charles E. Hewitt, Rochester; Gary F. Roberts, Macedon, all of N.Y.

[73] Assignee: Eastman Kodak Company, Rochester, N.Y.

[21] Appl. No.: 870,844

[22] Filed: Jun. 6, 1997

Related U.S. Application Data

[63] Continuation of Ser. No. 573,107, Dec. 15, 1995, abandoned.

[51] Int. Cl.$^6$ .............................. B32B 27/00; B25F 5/02; G03G 13/20

[52] U.S. Cl. ....................... 428/473.5; 428/447; 428/421; 492/46; 492/53; 492/56; 430/99

[58] Field of Search ................................ 428/473.5, 447, 428/421; 492/46, 53, 56; 430/99

[56] References Cited

U.S. PATENT DOCUMENTS

| | | | |
|---|---|---|---|
| 3,435,500 | 4/1969 | Aser et al. . | |
| 3,884,623 | 5/1975 | Slack . | |
| 3,912,901 | 10/1975 | Strella et al. . | |
| 3,967,042 | 6/1976 | Laskin et al. . | |
| 3,999,038 | 12/1976 | Sikes, Jr. et al. . | |
| 4,002,570 | 1/1977 | Lindblad et al. . | |
| 4,042,804 | 8/1977 | Moser . | |
| 4,104,963 | 8/1978 | Fortmann . | |
| 4,149,797 | 4/1979 | Imperial . | |
| 4,253,392 | 3/1981 | Brandon et al. . | |
| 4,257,699 | 3/1981 | Lentz . | |
| 4,272,179 | 6/1981 | Seanor . | |
| 4,522,866 | 6/1985 | Nishikawa et al. . | |
| 4,594,068 | 6/1986 | Bardutzky et al. . | |
| 4,711,818 | 12/1987 | Henry . | |
| 4,772,913 | 9/1988 | Watanabe . | |
| 4,789,565 | 12/1988 | Kon et al. . | |
| 4,942,434 | 7/1990 | Nakai et al. . | |
| 4,943,831 | 7/1990 | Geraets et al. . | |
| 5,011,401 | 4/1991 | Sakurai et al. . | |
| 5,017,432 | 5/1991 | Eddy et al. . | |
| 5,035,950 | 7/1991 | Del Rosario | 428/421 |
| 5,166,031 | 11/1992 | Badesha et al. . | |
| 5,187,849 | 2/1993 | Kobayashi . | |
| 5,189,480 | 2/1993 | Hoover et al. . | |
| 5,217,837 | 6/1993 | Henry et al. . | |
| 5,248,339 | 9/1993 | Fitzgerald et al. . | |
| 5,291,257 | 3/1994 | Cerrah et al. . | |
| 5,328,735 | 7/1994 | Okazaki et al. . | |
| 5,332,641 | 7/1994 | Finn et al. . | |
| 5,336,539 | 8/1994 | Fitzgerald | 428/36.8 |
| 5,345,301 | 9/1994 | Satoh et al. . | |
| 5,364,697 | 11/1994 | Miyabayashi . | |
| 5,370,931 | 12/1994 | Fratangelo et al. . | |
| 5,394,227 | 2/1995 | Huffman et al. . | |
| 5,406,362 | 4/1995 | Mills . | |
| 5,464,698 | 11/1995 | Chen et al. | 428/421 |
| 5,480,724 | 1/1996 | Fitzgerald et al. | 428/447 |

FOREIGN PATENT DOCUMENTS

| | | |
|---|---|---|
| 3108095 | 10/1982 | Germany . |
| 64-99249 | 11/1980 | Japan . |
| 54-101665 | 3/1981 | Japan . |
| 56-60471 | 5/1981 | Japan . |
| 79856 | 5/1988 | Japan . |
| 62-302127 | 9/1989 | Japan . |
| 63-302552 | 6/1990 | Japan . |
| 2037942 | 7/1980 | United Kingdom . |

OTHER PUBLICATIONS

IBM Technical Disclosure Bulletin, vol. 24, No. 12, May 1982.

Research Disclosure 16730, Mar. 1978.

*Primary Examiner*—Mark Chapman

*Attorney, Agent, or Firm*—Doreen M. Wells

[57] ABSTRACT

This invention provides a fuser member comprising a core having a polymeric coating wherein said wrinkle index of said fuser member is less than 75, said wrinkle index (WI) being calculated by the following formula:

$$WI = S + \frac{10}{T} + \frac{H}{5}$$

where:

S is the stiffness of the core in megaPascals (MPa);

T is the thickness of said polymeric coating in millimeters (mm); and

H is the hardness (Shore A) of the polymeric coating.

6 Claims, No Drawings

LOW WRINKLE PERFORMANCE FUSER MEMBER

This application is a continuation of application Ser. No. 08/573,107, filed Dec. 15, 1995, now abandoned.

FIELD OF THE INVENTION

This invention relates to a fuser member useful in a fusing system for fixing a toner material to a receiver. More particularly, this invention relates to a fuser member which imparts few wrinkles to the receiver when fixing the toner material to the receiver.

BACKGROUND OF THE INVENTION

Toners are widely used in imaging methods such as electrostatography, wherein electrically charged toner is deposited imagewise on a dielectric or photoconductive element bearing an electrostatic latent image. Most often in such methods, the toner is then transferred to a surface of a receiver such as paper or a transparent film, where it is then fixed in place to yield the final desired toner image.

One such well-known fusing method comprises passing the toner-bearing receiver through a fusing system. The receiver passes through a nip formed by pressurized contact of a pair of opposing rollers. Typically, at least one of the rollers (usually referred to as a fuser roller) is heated and contacts the toner-bearing surface of the receiver in order to heat and soften the toner. The other roller (usually referred to as a pressure roller) serves to press the receiver into contact with the fuser roller.

Pressure rollers and fuser rollers typically have a regular cylindrical shape, which provides for acceptable wrinkle performance under most operating conditions; however, when fusing systems operate under conditions of high humidity, it becomes increasingly difficult to provide acceptable wrinkle performance. This problem is aggravated when large sheets of paper are passed between the rollers.

In order to prevent wrinkles in the receiver as it passes through the nip, it has been disclosed in *Research Disclosure* 16730, March 1978 that it is advantageous to vary the overall diameter of the pressure roller along the direction of its axis such that the diameter is smallest at the midpoint of the axis and largest at the ends of the axis, in order to give the pressure roller a sort of "bow tie" or "hourglass" shape. This shape causes the pair of rollers to exert more pressure on the receiver in the nip at the areas near the ends of the rollers than at the area about the midpoint of the rollers. It is believed that this gradient of pressure helps to prevent wrinkles in the receiver as it passes through the nip. However, the pressure and fuser rollers tend to lose the bow-tie shape with use and therefore also lose the benefits of low wrinkle performance.

U.S. Pat. No. 5,406,362 discloses the use of at least one bendable roller in a fusing aparatus to prevent wrinkling of the receiver.

JP Abstract of Application No. 62-302127 discloses a roller that deflects when in pressurized contact with another roller. The surface hardness of the elastic material on the rollers provides for a flattened nip.

Improvements in fuser members for use in a fusing system which impart few, if any wrinkles to receivers is continuously sought.

SUMMARY OF THE INVENTION

This invention provides a fuser member comprising a core having a polymeric coating wherein said wrinkle index of said fuser member is less than 75, said wrinkle index (WI) being calculated by the following formula:

$$WI = S + \frac{10}{T} + \frac{H}{5}$$

where:

S is the stiffness of the core in megaPascals (MPa);

T is the thickness of said polymeric coating in millimeters (mm); and

H is the hardness (Shore A) of the polymeric coating.

This fuser member when used in an opposing relationship with a second fuser member imparts few, if any, wrinkles to receivers when toner-bearing receivers are passed through the fuser members to fix the toner onto the receiver.

DESCRIPTION OF THE INVENTION

This invention is directed to a fuser member. The term "fuser member" is used herein to refer to a component of a fusing system, also referred to as a fusing apparatus, that has a coated or uncoated cylindrically-shaped roller core. Examples of fuser members include fuser rollers, pressure rollers, and fuser belts mounted on roller cores.

The roller core of the fuser member can consist of any material providing that the stiffness of the core in conjunction with the thickness of the polymeric coating on the core and the hardness of the polymeric coating provide a wrinkle factor less than 75, more preferably less than 65, and most preferably less than 50.

The wrinkle factor formula is: the stiffness of the core in megaPascals (MPa) plus (10 divided by the thickness of said polymeric coating in millimeters (mm)) plus (the hardness (Shore A) of the polymeric coating divided by 5).

A preferred range for the stiffness of the core is 55 MPa ($8.0\times10^3$ pound/square inch (psi)) or less, more preferably a stiffness of 20.7 MPa to 51.7 MPa ($3.0\times10^3$ to $7.5\times10^3$ psi); most preferably 24 to 41.4 MPa ($3.5\times10^3$ to $6.0\times10^3$ psi). The stiffness of the core prior to coating with one or more layers of one or more polymeric materials can be measured by fastening the two ends of the core to a support, applying a uniform load to the core and measuring the amount of deflection at the middle of the core. The stiffness of the core equals the load divided by the distance that the core deflects at the middle of the core. See, for example, Shigley and Mischke, *Mechanical Eng. Design*, McGraw Hill, 5th Edition.

The stiffness can also be calculated using a formula for a simply supported core bearing a uniform load across the length of the core, consisting of a uniform material and having constant outside and inside diameters. The formula is as follows:

$$K = \frac{384\,E\,I}{5l^4}$$

where:

I is $$\frac{\pi}{64}\,(OD^4 - ID^4)$$

OD is the outside diameter of the uncoated core;

ID is the inside diameter of the uncoated core;

l is the length of the core excluding endcaps and bearings; and

E is the modulus of elasticity for the core material. The modulus of elasticity is a characteristic of the material used to make the core and can be obtained from most mechanical engineering handbooks, such as, Availone and Baumeister, *Mark's Standard for Mechanical Engineers*. For example, E for steel varies between 197 and 207 GPa ($28.6\times10^6$ and $30.0\times10^6$ psi) depending on the grade, and E for aluminum varies between 68.3 and 71.1 GPa ($9.9\times10^6$ and $10.3\times10^6$ psi) depending on the grade.

The presently preferred core is one which has a constant OD, ID, l and E, but it is not required that the core of this invention have a constant OD, ID, l and E. If the properties of the core, such as OD, ID, l and E are not constant over the entire length of the core, the particular formula for the stiffness for that unique core is available from mechanical engineering reference books or can be derived, or the stiffness can be physically measured as described above.

Examples of suitable core materials are metals, such as, steel, stainless steel, aluminum, anodized aluminum, and copper; graphite; composites, such as, graphite composites, polyimide composites, and carbon fiber composites; alloys, such as, magnesium alloys, chromium alloys, and nickel alloys; and laminates, such as, polyimide laminates, graphite laminates, and carbon fiber laminates. The preferred core materials are metals. The most preferred metal is aluminum.

Suitable core stiffnesses are usually provided by cores having an outside diameter between 25 and 75 mm (1 and 3 inches) and an inside diameter between 0 and 74.75 mm (0 and 2.99 inches). The wall thicknesses of the core are typically between 6.25 and 0.75 mm (0.25 and 0.030 inches).

The most preferred core is an aluminum core having an outside diameter of 52.5 mm (2.1 inches) and an inside diameter of 47.6 mm (1.875 inches).

The fuser member of this invention consists of a coated roller core. A coated roller core is one that has one or more polymeric layers of one or more polymeric materials attached to the core. It is preferred that the polymeric coating is of uniform thickness on the core, and that the core has a uniform OD so that the overall OD of the core and polymeric coating is constant over the length of the core. The polymeric coating can consist of one or more layers of one or more known materials for fuser member coatings such as, silicone rubbers, fluorosilicone rubbers, fluoroelastomers, or fluoropolymer resins or mixtures of these materials in one or more layers.

Examples of silicone rubbers consist of polymethyl siloxanes, such as EC-4952™, sold by Emerson Cummings or Silastic ™ J or E sold by Dow Corning. Examples of fluorosilicone rubbers include polymethyltrifluoropropylsiloxanes, such as, Sylon™, and Fluorosilicone FX11293™ and FX11299™ sold by 3M. The silicone rubbers can be either addition-cure or condensation-cure silicone rubbers.

Examples of fluoroelastomers include copolymers of vinylidene fluoride and hexafluoropropylene, copolymers of tetrafluoroethylene and propylene, terpolymers of vinylidene fluoride, hexafluoropropylene and tetrafluoroethylene, copolymers of vinylidene fluoride, tetrafluoroethylene and perfluoromethylvinylethyl, and copolymers of vinylidene fluoride, tetrafluoroethylene, and perfluoromethylvinylether. Specific examples of fluoroelastomers which are useful in this invention are commercially available from E. I. DuPont de Nemours and Company under the trade names Kalrez™, and Viton™ A, B, G, GF and GLT, and from 3M under the trade names Fluorel™ FC 2174, 2176 and FX 2530 and Atlas™. Additional fluoroelastomers are disclosed in U.S. Pat. No. 3,035,950, the disclosure of which is incorporated herein by reference. Mixtures of the foregoing fluoroelastomers may also be suitable. The number-average molecular weight range of the fluoroelastomers may vary from a low of about 10,000 to a high of about 200,000. The preferred fluoroelastomers have a number-average molecular weight range of about 50,000 to about 100,000.

Examples of fluoropolymer resin materials consist of a semicrystalline fluoropolymer or a semicrystalline fluoropolymer composite. Such materials include polytetrafluoroethylene (PTFE), polyperfluoroalkoxy-tetrafluoroethylene (PFA), polyfluorinated ethylene-propylene (FEP), poly (ethylenetetrafluoroethylene), polyvinylfluoride, polyvinylidene fluoride, poly(ethylene-chloro-trifluoroethylene), polychlorotrifluoroethylene and mixtures of fluoropolymer resins. Some of these fluoropolymer resins are commercially available from DuPont as Teflon™ or Silverstone™ or Supra Silverstone™ materials.

The core can be coated with primer and/or primer can be used between any layers of materials coated on the core. Examples of suitable primer materials include silane coupling agents, which can be either epoxy-functionalized or amine-functionalized, epoxy resins, benzoguanamineformaldehyde resin crosslinker, epoxy cresol novolac, dianilinosulfone crosslinker, polyphenylene sulfide polyether sulfone, polyamide, polyimide and poly(amide-imide). Preferred primers are epoxy-functionalized silane coupling agents. The most preferable primers for a fluoroelastomer layer coated on a metal core is a dispersion of Thixon™ 300, Thixon™ 311 and triphenylamine in methyl ethyl ketone. The Thixon™ materials are supplied by Morton Chemical Co. Preferred primer and silicone rubber systems for coating on a metal core are GE 4044™ available from General Electric Co. and EC-4952™; and DC1200™ and Silastic J™ available from Dow Corning.

The polymeric materials on the coated fuser member can consist of additional addenda, for example curing agents, curing catalysts, release oils, and fillers as needed or desired to effect the characteristics, such as release, hardness or surface roughness of the coated fuser member. These are known to a person of ordinary skill in the art.

The polymeric coating can consist of one or more layers of one or more polymeric materials on the core of the fuser member. The polymeric coating preferably has a total thickness of 0.25 millimeters (mm) to 6.25 mm. More preferably, the polymeric coating has a thickness of 0.50 mm to 2.5 mm. Most preferably, the polymeric coating has a thickness of from 0.75 mm to 1.5 mm. The thickness of the polymeric coating is measured using Dial Calipers.

The polymeric coating on the core of the fuser member preferably has a hardness of from 10 to 100 Shore A. More preferably, the polymeric coating on the core has a hardness of from 20 to 70 Shore A, most preferably from 25 to 60 Shore A, and even more preferred 35 to 50 Shore A. The hardness of the polymeric coating on the core of the fuser member is measured according to ASTM D2240.

If the polymeric coating on the core consists of more than one layer of more than one polymeric material, then the value of the hardness to be used in the wrinkle index formula is determined by measuring the hardness of the the multi-layered material according to ASTM D2240. Additionally, the value of the thickness used in the wrinkle index formula is the total thickness of the multi-layered materials.

Although the coefficient of friction is not part of the wrinkle factor formula, it is preferred that the surface of the fuser member which contacts the receiver has a coefficient of friction from 0.1 to 1.0. More preferably, the surface of the fuser member which contacts the receiver preferably has a coefficient of friction from 0.35 to 0.6. The coefficient of friction of the surface of the rollers was measured by placing the roller on a piece of B4 Paper, 30 cm by 43 cm, 6.82 kg ( 11 inch by 17 inch, 16 pound) that was attached to a horizontal table top, attaching a pull scale to the roller, measuring the force needed to pull the roller, and dividing the force by the weight of the roller.

It is preferred that the roller have an outermost coating also referred to as a topcoat of a non-oil swell polymeric material over a base cushion layer of one or more layers of one or more polymeric materials. The preferred base cushion layer materials are silicone rubbers, fluorosilicone rubbers and/or fluoroelastomers; the most preferred are silicone rubbers. The preferred topcoat materials are fluoropolymer resins, fluoroelastomers and fluorosilicone rubbers; the most preferred are fluoropolymer resins. Examples of all these materials were previously listed. The thickness of the topcoat layer is preferably less than 0.25 mm, more preferably between 0.025 and 0.05 mm.

The presently preferred fuser member is a roller having a polymeric coating consisting of a 1.25 mm layer of a condensation-cure polydimethyl siloxane rubber and a 0.025 mm topcoat of PFA. It is presently preferred to make the coated roller by microextruding the silicone rubber into a mold into which a PFA sleeve and a roller core have been previously inserted. The hardness of the polymeric coating is between 40 and 45 Shore A.

The fuser member may additionally be coated with a release aid such as polydimethylsiloxane (PDMS) oil or mecapto-functionalized PDMS oil when in the fusing system.

The fuser member described above is useful in a fusing system. Although the fuser member of this invention is useful in any fusing system configuration using a fuser member having a core, such as, a fuser system consisting of two rollers in contact, two belts in contact or a belt and a roller in contact, the preferred fuser system consists of a fuser roller and a pressure roller which are in pressurized contact and form a nip through which a toner-bearing receiver is passed. The rollers are preferably held in pressurized contact by springs, air pressure, thermal expansion or hydraulic fluid. Typically the rollers are pressed together at a pressure less than 0.909 kg/mm (50 pounds per linear inch (pli)), more preferably 0.273 to 0.455 kg/mm (15 to 25 pli), and most preferably about 0.3636 kg/mm (20 pli). Many suitable mechanical configurations of the fuser systems consisting of a fuser roller and a pressure roller have been disclosed in the prior art. Although it is not mandatory, it is preferred that at least one of the rollers, typically the fuser roller, is heated. In this fuser system at least one the rollers has the wrinkle index due to the stiffness, thickness of the polymeric coating, and hardness described above.

It is presently preferred that the fuser member of this invention is the pressure roller used in a fusing apparatus consisting of a fuser roller and a pressure roller. The fuser roller used with the preferred pressure roller of this invention can be an internally or externally heated fuser roller. If the fuser roller is heated internally, it is preferred that it has no polymeric coating, or a polymeric coating less than 2.5 mm. However, it is presently preferred that the fuser roller is externally heated by a heated roller core in contact with the fuser roller. It is also preferred that the fuser roller has a stiff core, that is, a core having a stiffness greater than 82.5 MPa. Further, it is preferred that the fuser roller is a coated roller that has a higher hardness of the polymeric coating than the hardness of the polymeric coating on the pressure roller, and that the thickness of the polymeric coating on the fuser roller is greater than 2.5 mm, more preferably greater than 9.5 mm. Additionally, it is preferred that the fuser roller has a bigger overall outside diameter than the pressure roller. The overall outside diameters are measured around the polymeric coating on the individual rollers. It is preferred that the ratio of the overall outside diameters of the fuser roller to the pressure roller is greater than 1.0, more preferably greater than 1.04.

The following examples are presented to further illustrate specific fuser members in fusing systems in accordance with the invention and to compare them to fusing members in fusing systems which are not in accordance with the invention.

EXAMPLES

Eight coated rollers were prepared. Different combinations of core stiffnesses, polymeric coatings, hardnesss of the polymeric coatings and coefficients of friction were used to make the eight rollers.

The eight roller cores were aluminum cores having a length of 376.9 mm (14.84 in), and an outside diameter of 53.5 mm (2.1 in) and E for the aluminum was 68.95 GPa ($1\times10^7$ psi). Four of the roller cores used had a stiffness of 53.8 MPa ($7.83\times10^3$ psi) and an inside diameter of 44.5 mm (1.75 in). The other four cores had a core stiffness of 28.5 MPa ($4.15\times10^3$ psi) and an inside diameter of 49.0 mm (1.93 in).

Three polymeric materials were used to coat the roller cores. The polymeric materials will be referred to as Polymer A, Polymer B, and Polymer C.

Polymer A consisted of a condensation-cure silicone rubber, EC-4952™, available from the Emerson Cumming Division of W. R. Grace and Co., incorporated with 1% by weight DC-200™ based on the total weight of EC-4952 ™. DC-200™ is a PDMS silicone oil, 60,000 centistokes at 25° C., available from Dow Corning Corporation.

Polymer B consisted of a silicone rubber, EC-4952™ incorporated with 10% by weight DC-200™,60,000 centistokes at 25° C. PDMS silicone oil based on the total weight of EC-4952™.

Polymer C was a fluoroelastomer FX-2530™, a copolymer of hexafluoropropylene and vinylidene fluoride, available from 3-M. The preparation of the three polymeric materials and the coating of the cores was as follows:

Cores coated with Polymer A 400 grams of EC-4952™ and 4 grams DC-200™ were combined, stirred by hand, and rolled on a ball mill overnight. 1.6 grams of Catalyst 50™ available from Emerson Cummings was added to oil-incorporated EC-4952™ right before blade coating the polymeric material onto the metal core.

Cylindrical stainless steel cores were cleaned with dichloromethane and dried. The roller core was primed with GE 4044™ available from General Electric, air dried for 30 minutes, and heated to 100° C. for 30 minutes to cure the primer. After cooling the metal core, the oil-incorporated EC-4952 was blade coated directly onto the metal core, and cured for 12 hours ramp to 205° C., followed by 18 hours at 205° C. in a convection oven. After cooling, the oil-incorporated EC-4952™ layer was ground either to 1.5 mm or to 0.75 mm.

Cores coated with Polymer B

The process outlined above for coating the cores with Polymer A was repeated except that 400 grams of EC-4952™ and 40 grams DC-200™ were combined, stirred by hand, and rolled on a ball mill overnight.

Polymer C Coating Composition

FX-2530™ was compounded with 3 parts MgO and 6 parts of $Ca(OH)_2$ on a two-roll mill until a uniform blend was obtained. An 85:15 mixture of methyl ethyl ketone and methanol was added to the blend to make a 20% by weight solids solution and this solution was ball milled about 3 hours. To this solution was was added 5 parts of amino PDMS oil (PS-513™ which is available from United Chemical) to form the Polymer C coating composition.

Cores Coated with Polymer A and Polymer C

The cores coated with Polymer A (described above) were ring-coated with the Polymer C coating composition (described above), air dried for 16 hours, baked with ramping for 24 hours to 260° C. and then maintained at 260° C. for 24 hours. The Polymer C Coating was 0.025 mm thick.

Cores coated with Polymer B and Polymer C

Two of the cores coated with Polymer B (described above) were ring-coated with the Polymer C coating solution (described above), air dried for 16 hours, baked with ramping for 24 hours to 260° C. and then maintained at 260° C. for 24 hours.

The thickness of the polymeric materials coated on the cores were measured using Dial Calipers. The hardness of the polymeric materials was measured by ASTM D2240 and the kinetic coefficient of friction of the surface of the rollers was measured by placing the roller on a piece of B4 paper produced by Georgia Pacific that was attached to a horizontal table top, attaching a 0 to 1020 gm (0 to 36 ounce) pull scale by Chatilion to the roller, measuring the force needed to pull the roller, and dividing the force by the mass of the roller.

Wrinkle Performance

Each of the rollers was used as a pressure roller in a fusing system consisting of a fuser roller and a pressure roller. The fuser roller used was the ground rough red rubber coated fuser roller used in the Kodak 2100™ copier. The fuser roller was externally heated by contacting an internally-heated anodized aluminum core. The pressure rollers were mounted into the externally heated fusing system. The temperature of the outside surface of the fuser roller was 177° C. (350° F.). The pressure in the nip was 0.4 kg/mm (22 pli). The fuser speed was 450 mm/sec ( 18 inches/sec).

25 sheets of B4 paper were run landscape through the fuser for each roller. Approximately 37.5 mm( 1.5 inches) of the leading edge of each sheet was embossed to simulate the fluting of the leading edge that occurs in high humidity environments. The sheets were embossed by pressing each sheet between two rollers into which a sin wave was carved into the rubber of the rollers. The distance of the sin wave from peak to valley was about 3.75 mm (0.15 inches) and the sin wave repeated 6 times across the 30-cm (11-inch) side of the paper. Embossing the paper is an effective way to generate wrinkling of the paper when it passes through a fusing system. For each roller the 25 sheets were visually analyzed and the lengths of wrinkles were measured summed and averaged. The results of this testing are listed in Table 1.

The data indicates that the strongest contributers to good wrinkle performance are lower core stiffness, and lower rubber hardness.

TABLE 1

| Ex No | Polymer Coating | Stiffness (MPa) | Polymer thickness (mm) | Hardness (Shore A) | Coefficient of Friction | Wrinkles (mm/sheet) | WI |
|---|---|---|---|---|---|---|---|
| 1 | B & C | 53.8 | 0.75 | 35 | 0.37 | 11.75 | 74.1 |
| 2 | B | 53.8 | 1.5 | 35 | 0.58 | 30.5 | 67.4 |
| 3 | A & C | 53.8 | 1.5 | 65 | 0.41 | 24.5 | 73.4 |
| 4 | B | 28.5 | 0.75 | 35 | 0.58 | 0 | 48.8 |
| 5 | A & C | 28.5 | 0.75 | 65 | 0.41 | 18.25 | 54.8 |
| 6 | B & C | 28.5 | 1.5 | 35 | 0.37 | 0 | 42.1 |
| 7 | A | 28.5 | 1.5 | 65 | 0.51 | 0 | 47.1 |

Comparative Examples

Core Coated with Polymer A

Prepared as described above.

Core Coated with Polymer D 100 parts of Eccosil™ 5877 Part A from Emerson and Cuming and 10 parts of Eccosil™ 5877 Part B were throughly mixed by hand in a beaker and ring-coated on an aluminum core having a stiffness of 25.4 MPa (3.7 K). The coated core was air-dried then cured in an convectional oven for 1 hour at 100° C., followed by a post cure at 175° C. for 2 hours. The dry-thickness of the coated layer was 0.025 mm.

Core Coated with Polymer E

A 5.5 mm (0.220 inch) thick aluminum cylindrical core with a 55 mm (2.2 inch) outside diameter and 371 mm (14.84 inch) length that was blasted with glass beads and cleaned and dried with dichloromethane was uniformly spray-coated with a primer to a uniform thickness between 0.0125 and 0.025 mm (0.5 to 1 mil). The primer consisted of 1 gram of Thixon™ 300, 1 gram of Thixon™ 311 and 2 grams of a mixture of 0.5 grams triphenylamine in 40 grams of methyl ethyl ketone. The primer was air dried for 15 minutes and placed in a convection oven at 325° F. for 45 minutes. The fluoroelastomer coating was prepared by compounding 100 parts of Viton™ A, 3 parts Cure™ 20, 6 parts Cure ™ 30, 20 parts Thermax™ and 15 parts lead oxide in a two roll mill for about 30 to 45 minutes until a uniform composite was produced. Approximately 610 grams of the fluoroelastomer composite were compression molded onto the primer layer on the core and cured at 325° F. for 2 hours under $12\times10^3$ $kg/cm^2$ (75 $tons/in^2$) pressure. The mold was opened and closed a few times initially to squeeze entrapped air out of the fluoroelastomer material. The roller was removed from the mold, and placed in a convection oven for post-curing. The conditions for the post-cure were a 24 hour ramp to 232° C. and 24 hours at 232° C. The fluoroelastomer layer was ground to 1.5 mm in thickness.

Core Coated with Polymer E & F

Over the 1.5 mm of Polymer E, Polymer F was coated. A uniform layer of primer about 0.3 mils thick was spray-coated onto the fluoroelastomer layer. The primer was Silverstone™ 855-021 from DuPont. The primer consisted of an aqueous dispersion of polyamic acid and PTFE. The primer was air dried. A layer of Supra Silverstone™ 855-500, a blend of PTFE and PFA fluoropolymer resins, was spray-coated onto the primer layer to about 0.025 mm (1.0 mil) thickness. The fuser member was then placed in a convection oven at 700° F. for approximately 10 minutes to sinter the Supra Silverstone™.

Wrinkle Performance

Each of the rollers was used as a pressure roller in a fusing system consisting of a fuser roller and a pressure roller as described above for the examples of the invention. The wrinkles (mm/sheet) were determined as desribed above for the examples of the invention. The results of this testing are listed in Table 2.

TABLE 2

| Comp Ex No | Polymer Coating | Stiff-ness (MPa) | Polymer thick-ness (mm) | Hard-ness (Shore A) | Coeffi-cient of Friction | Wrin-kles (mm/sheet) | WI |
|---|---|---|---|---|---|---|---|
| C-1 | A | 53.8 | 0.75 | 65 | 0.51 | 219.25 | 80.1 |
| C-2 | D | 25.4 | 0.025 | >100 | 0.94 | 104 | 445 |
| C-3 | E | 82.5 | 1.5 | 72.0 | 0.24 | 247 | 103.5 |
| C-4 | E & F | 82.5 | 1.5 | 72.0 | 0.13 | 260 | 103.5 |

Additional Comparative Examples Commercially Available Fuser Systems Wrinkle Performance The commercially available fuser systems listed in Table 3 were each tested using 25 sheets of the embossed B4 paper, as described above. The results were analyzed, as described above, and are listed in Table 3.

TABLE 3

| System | Wrinkles(mm/sheet) |
|---|---|
| EK-2100 ™ made by Eastman Kodak Company | 500 |
| Xerox 5090 ™* made by Xerox | 200 |
| NP-9800 ™* made by Canon | 160 |
| EK-90 ™ made by Canon for Eastman Kodak Company | 25 |

*Hour-glass-shaped pressure roller

We claim:

1. A pressure roller for use in a fusing system, said pressure roller comprising a core having a polymeric coating wherein the wrinkle index of said pressure roller is less than 50, said wrinkle index being calculated by the following formula:

$$WI = S + \frac{10}{T} + \frac{H}{5}$$

where:

S is the stiffness of the core in megaPascals (MPa);

T is the thickness of said polymeric coating in millimeters (mm); and

H is the hardness (Shore A) of the polymeric layer; and where:

the stiffness of the core is 24 to 41.4 MPa, the thickness of the polymeric coating is at least 0.75 mm, the Shore A hardness of the polymeric layer is from 20 to 70, the polymeric coating comprises a silicone rubber incorporated with silicone oil, and the overall outside diameter of the core and polymeric coating is constant over the length of the core.

2. The pressure roller of claim 1 wherein said polymeric coating has a thickness from 0.75 mm to 1.5 mm.

3. The pressure roller of claim 1 wherein said polymeric coating has a hardness from 25 to 60 Shore A.

4. The pressure roller of claim 1 wherein said surface of said pressure roller has a coefficient of friction from 0.1 to 1.0.

5. The pressure roller of claim 1 wherein said surface of said pressure roller has a coefficient of friction from 0.35 to 0.6.

6. The pressure roller of claim 1 wherein said polymeric coating comprises a silicone rubber layer and fluoropolymer resin layer.

* * * * *